(12) United States Patent
Donaldson et al.

(10) Patent No.: US 11,275,906 B2
(45) Date of Patent: Mar. 15, 2022

(54) NATURAL LANGUAGE TEXT CONVERSION AND METHOD THEREFOR

(71) Applicant: Avigilon Corporation, Vancouver (CA)

(72) Inventors: Roger David Donaldson, Vancouver (CA); Cathy Jiao, Coquitlam (CA)

(73) Assignee: AVIGILON CORPORATION, Vancouver (CA)

( * ) Notice: Subject to any disclaimer, the term of this patent is extended or adjusted under 35 U.S.C. 154(b) by 268 days.

(21) Appl. No.: 16/514,932

(22) Filed: Jul. 17, 2019

(65) Prior Publication Data
US 2021/0019374 A1 Jan. 21, 2021

(51) Int. Cl.
| G06F 40/56 | (2020.01) |
| G06N 20/00 | (2019.01) |
| G06F 40/30 | (2020.01) |
| G06F 40/211 | (2020.01) |

(52) U.S. Cl.
CPC ............ *G06F 40/56* (2020.01); *G06F 40/211* (2020.01); *G06F 40/30* (2020.01); *G06N 20/00* (2019.01)

(58) Field of Classification Search
None
See application file for complete search history.

(56) References Cited

U.S. PATENT DOCUMENTS

| 6,330,530 | B1* | 12/2001 | Horiguchi | ............ | G06F 40/211 |
| | | | | | 704/4 |
| 6,430,552 | B1 | 8/2002 | Corston-Oliver | | |
| 8,751,505 | B2 | 6/2014 | Carmel et al. | | |
| 9,679,080 | B2 | 6/2017 | Lee et al. | | |
| 9,728,185 | B2* | 8/2017 | Schalkwyk | ............ | G10L 15/187 |
| 2005/0060286 | A1 | 3/2005 | Hansen et al. | | |
| 2007/0169021 | A1* | 7/2007 | Huynh | ............ | G16H 15/00 |
| | | | | | 717/136 |
| 2009/0144262 | A1 | 6/2009 | White et al. | | |
| 2010/0312549 | A1* | 12/2010 | Akuwudike | ............ | G06F 16/367 |
| | | | | | 704/9 |
| 2011/0184946 | A1 | 7/2011 | Hennum et al. | | |

(Continued)

OTHER PUBLICATIONS

Schreiber, A. Th., et al., "Ontology-Based Photo Annotation," IEEE Intelligent Systems, University of Amsterdam, Jun. 2001, pp. 2-10.

(Continued)

*Primary Examiner* — Quynh H Nguyen
(74) *Attorney, Agent, or Firm* — Perry + Currier, Inc.

(57) ABSTRACT

Multiple natural language training text strings are obtained. For example, text portions may be randomly selected and converted into natural language text based on one or more randomly selected rules. A formatted training text string is generated for each natural language training text string, for example using a context-free grammar parser. The formatted training text strings are inputted to a machine learning model. For each formatted training text string, using the machine learning model, a natural language text string is generated. The natural language text string is associated with one of the natural language training text strings. One or more parameters of the machine learning model are adjusted based on one or more differences between at least one of the natural language text strings and its associated natural language training text string.

19 Claims, 13 Drawing Sheets

(56) References Cited

U.S. PATENT DOCUMENTS

| | | | | |
|---|---|---|---|---|
| 2012/0296635 | A1* | 11/2012 | Brockett | G06F 40/131 |
| | | | | 704/9 |
| 2015/0278356 | A1 | 10/2015 | Yaffe | |
| 2016/0078017 | A1* | 3/2016 | Allen | G06F 40/166 |
| | | | | 704/9 |
| 2019/0130202 | A1 | 5/2019 | Doumbouya et al. | |
| 2020/0089757 | A1* | 3/2020 | Machado | G06F 40/30 |
| 2020/0311206 | A1* | 10/2020 | Omanwar | G06F 40/284 |

OTHER PUBLICATIONS

Styrman, A., "Ontology-Based Image Annotation and Retrieval," Master of Science Thesis, University of Helsinki Department of Computer Science, Apr. 27, 2005, pp. 1-95.

Koletsis, P. et al., "SIA: Semantic Image Annotation using Ontologies and Image Content Analysis," in Image Analysis and Recognition: 7th International Conference, ICIAR 2010, Póvoa de Varzim, Portugal, Jun. 21-23, 2010, Proceedings, Part I, pp. 374-383.

Hardwick, J., "Google Search Operators: The Complete List (42 Advanced Operators)," retrieved Nov. 21, 2018, from <https://ahrefs.com/blog/google-advanced-search-operators/>.

VRA Core 4.0 Element Description, Apr. 5, 2007, available at <https://www.loc.gov/standards/vracore/VRA_Core4_Element_Description.pdf>.

* cited by examiner

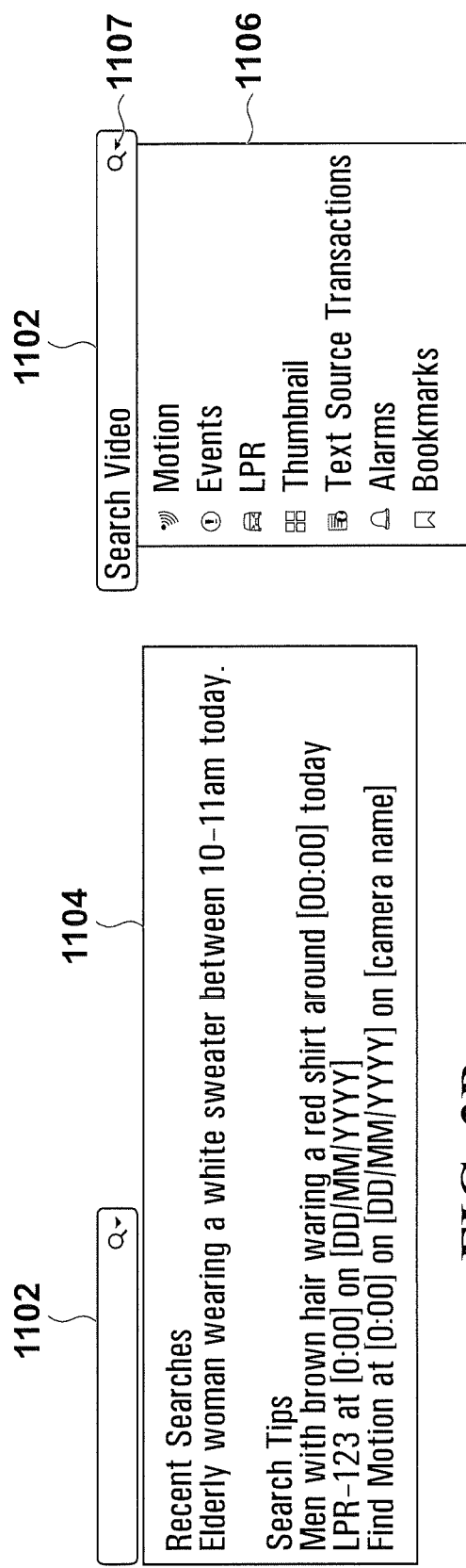
FIG. 3B
FIG. 3C
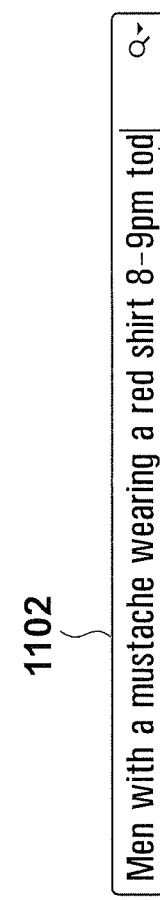
FIG. 3D

1004

1108

1016
1018
1010
1006

| Search Options | ✕ |
|---|---|
| We found various results matching your description: |
| You searched for: A man wearing a red t-shirt and jeans |

| ⧈ Appearances | 99+ Results ‹ |
|---|---|

Gender: ☐ Female ☑ Male

Age: [Any ▸]

Clothing Type: [Jeans, T-Shirt ▸]

Clothing Color & Pattern: [Red ▸]

Hair Color: [Any ▸]

[Search] [Cancel]

| ·)) Motion | 99+ Results › |
|---|---|
| ⊙ Events | 99+ Results › |
| 🖼 LPR | 99+ Results › |

FIG. 3E

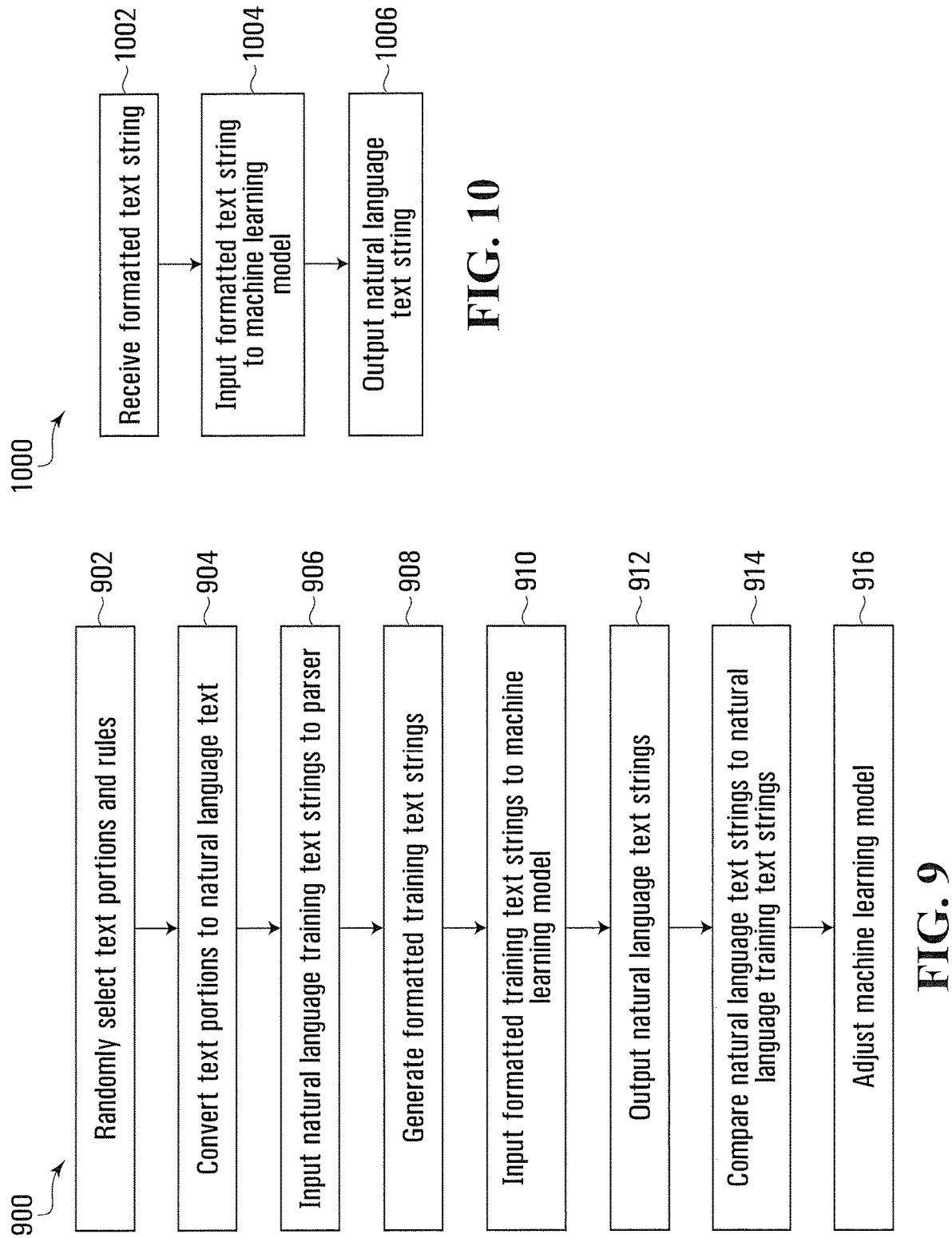

NATURAL LANGUAGE TEXT CONVERSION AND METHOD THEREFOR

FIELD OF THE DISCLOSURE

The present disclosure relates to a method of converting natural language text to formatted text using an inverse parser, and to a method of training such an inverse parser. The present disclosure also relates to a method of converting formatted text to natural language text using a machine learning model.

BACKGROUND TO THE DISCLOSURE

Users wishing to query a database are typically constrained to interact with the database via pointer-based user interfaces, or interfaces that do not scale well as the complexity of the database schema increases. As an example, a user wishing to query a database of images, audio recordings or videos in order to identify an object of interest may be presented with a multitude of different options or facets that could be used to describe the object of interest. Furthermore, as image recognition techniques improve, the total number of facets that a user may select from also increases to the point where it may become overly time consuming and burdensome to scroll through a large list of facets, identify and select those of interest, and then input them to the database in the form of a search query.

The inverse is also true: output from a database may be difficult for a user to efficiently understand without excessive time investment. Continuing with the example from above, with the large number of facets that may be used to describe an object of interest, the output from a database in response to a search query may be very large and difficult for a user to parse. It would therefore be useful if, together with an image or a video output from a database, the user could be provided with more concise and more relevant information identifying why the image or video has been returned by the database.

SUMMARY OF THE DISCLOSURE

According to a first aspect of the disclosure, there is provided a method comprising: obtaining multiple natural language training text strings; for each natural language training text string, generating a formatted training text string; inputting the formatted training text strings to a machine learning model; for each formatted training text string, generating, using the machine learning model, a natural language text string, wherein the natural language text string is associated with one of the natural language training text strings; and adjusting one or more parameters of the machine learning model based on one or more differences between at least one of the natural language text strings and its associated natural language training text string. In at least some aspects, by text string it is meant a sequence of symbols, where the symbols are selected from an alphabet. Example alphabets comprise the collection of capital and lowercase Latin letters, the Latin letters plus numeric digits and punctuation, the ASCII character set, and the Unicode character set. Irrespective of the specific alphabet, the alphabet's symbols, and thus the derived text strings, may be represented as finite sequences of digital bytes.

Obtaining the natural language training text strings may comprise: selecting text portions from a database of text portions; applying one or more rules to the selected text portions; and converting one or more of the selected text portions into natural language text, based on the application of the one or more rules.

Selecting the text portions may comprise randomly selecting the text portions.

The method may further comprise, prior to applying the one or more rules, randomly selecting the one or more rules from a preset collection of rules.

Generating the formatted training text strings may comprise inputting each natural language training text string to a text parser. The text parser may, for example, comprise a deterministic system such as a context free grammar parser, or may be statistical, such as a neural parser. Regardless, the parser may use expected patterns in the language training text string in order to identify associations between text string symbols.

The method may further comprise: after adjusting the one or more parameters of the machine learning model, inputting a further formatted text string to the machine learning model; and generating, using the machine learning model, a further natural language text string.

The method may further comprise: receiving an input indicating one or more adjustments to be made to the generated further natural language text string; and updating the generated further natural language text string based on the input.

The method may further comprise: converting the updated natural language text string to a further formatted text string; and querying a database using the further formatted text string.

Each formatted text string may be formatted for querying a database. Equally, each formatted text string may be formatted such that it is representative of an entry in a database.

The database may comprise one or more of: images, audio recordings; and video.

Each formatted text string may comprise one or more keywords from a keyword database, and one or more of: each image; each audio recording; and each video may be associated with corresponding metadata comprising one or more keywords from the keyword database.

According to a further aspect of the disclosure, there is provided a system comprising one or more processors communicative with computer-readable memory, wherein the one or more processors are configured to: receive multiple natural language training text strings; for each natural language training text string, generate a formatted training text string; input the formatted training text strings to a machine learning model; for each formatted training text string, generate, using the machine learning model, a natural language text string, wherein the natural language text string is associated with one of the natural language training text strings; and adjust one or more parameters of the machine learning model based on one or more differences between at least one of the natural language text strings and its associated natural language training text string.

The system may comprise any of the features described above in connection with the first aspect of the disclosure. The one or more processors may be configured to perform any of the operations described above in connection with the first aspect of the disclosure.

According to a further aspect of the disclosure, there is provided a computer-readable medium having stored thereon computer program code configured when executed by one or more processors to cause the one or more processors to perform a method comprising: receiving multiple natural language training text strings; for each natural language training text string, generating a formatted training text string; inputting the formatted training text strings to a machine learning model; for each formatted training text string, generating, using the machine learning model, a natural language text string, wherein the natural language text string is associated with one of the natural language training text strings; and adjusting one or more parameters of the machine learning model based on one or more differences between at least one of the natural language text strings and its associated natural language training text string.

The method may comprise any of the features and/or operations described above in connection with the first aspect of the disclosure.

According to a further aspect of the disclosure, there is provided a method comprising: obtaining a formatted text string; inputting the formatted text string to an inverse parser comprising a machine learning model trained to convert formatted text into natural language text; and generating, using the inverse parser, a natural language text string.

The method may further comprise: receiving an input indicating one or more adjustments to be made to the natural language text string; and updating the natural language text string based on the input.

The method may further comprise: converting the updated natural language text string to a further formatted text string; and using the further formatted text string to query a database.

Obtaining the formatted text string may comprise generating the formatted text string in accordance with contents of one or more: an image; an audio recording; and video.

The formatted text string may be formatted for querying a database.

The database may comprise one or more of: images; audio recordings; and video.

The formatted text string may comprise one or more keywords from a keyword database, and one or more of: each image; each audio recording; and each video may be associated with corresponding metadata comprising one or more keywords from the keyword database.

According to a further aspect of the disclosure, there is provided a system comprising one or more processors communicative with computer-readable memory, wherein the one or more processors are configured to: receive a formatted text string; input the formatted text string to an inverse parser comprising a machine learning model trained to convert formatted text into natural language text; and generate, using the inverse parser, a natural language text string. The one or more processors may be further configured to cause the natural language text string to be displayed.

The system may comprise any of the features described above in connection with the conversion of formatted text to natural language text. The one or more processors may be configured to perform any of the operations described above in connection with the conversion of formatted text to natural language text.

According to a further aspect of the disclosure, there is provided a system comprising a client device and one or more servers. The client device is configured to send a formatted text string to the one or more servers. The one or more servers are configured to: input the formatted text string to an inverse parser comprising a machine learning model trained to convert formatted text into natural language text; generate, using the inverse parser, a natural language text string; and send the natural language text string to the client device for display thereon.

According to a further aspect of the disclosure, there is provided a computer-readable medium having stored thereon computer program code configured when executed by one or more processors to cause the one or more processors to perform a method comprising: receiving a formatted text string; inputting the formatted text string to an inverse parser comprising a machine learning model trained to convert formatted text into natural language text; and generating, using the inverse parser, a natural language text string. The method may further comprise causing the natural language text string to be displayed.

The method may comprise any of the features and/or operations described above in connection with the conversion of formatted text to natural language text.

According to a further aspect of the disclosure, there is provided a method comprising: receiving a natural language text string; accessing a keyword database comprising keywords; determining whether to update the natural language text string by, for each of one or more text portions of the natural language text string: determining, using the keyword database, whether to convert the text portion into an updated text portion corresponding to one or more of the keywords; and if so, converting the text portion into the updated text portion; and after determining whether to update the natural language text string, using a parser to convert the natural language text string into a formatted text string.

The parser may comprise a context-free grammar parser or a neural parser.

The formatted text string may be formatted for querying a target database.

The target database may comprise one or more of: images; audio recordings; and video.

The formatted text string may comprise one or more keywords from the keyword database, and one or more of: each image; each audio recording; and each video may be associated with corresponding metadata comprising one or more keywords from the keyword database.

The method may further comprise, prior to determining whether to update the natural language text string: accessing a dictionary database; determining, using the dictionary database, whether to correct a spelling of one or more text portions of the natural language text string; and if so, correcting the spelling of the one or more text portions.

The method may further comprise querying the target database using the formatted text string.

Determining whether to convert the text portion into an updated text portion may be further based on one or more of a thesaurus and a word tree.

According to a further aspect of the disclosure, there is provided a system comprising one or more processors communicative with computer-readable memory, wherein the one or more processors are configured to: receive a natural language text string; access a keyword database comprising keywords; determine whether to update the natural language text string by, for each of one or more text portions of the natural language text string: determining, using the keyword database, whether to convert the text portion into an updated text portion corresponding to one or more of the keywords; and if so, converting the text portion into the updated text portion; and after determining whether to update the natural language text string, use a parser to convert the natural language text string into a formatted text string.

The system may comprise any of the features described above in connection with the conversion of natural language text into formatted text. The one or more processors may be configured to perform any of the operations described above in connection with the conversion of natural language text into formatted text.

According to a further aspect of the disclosure, there is provided a system comprising a client device and one or more servers. The client device is configured to send a natural language text string to the one or more servers. The one or more servers are configured to: access a keyword database comprising keywords; determine whether to update the natural language text string by, for each of one or more text portions of the natural language text string: determining, using the keyword database, whether to convert the text portion into an updated text portion corresponding to one or more of the keywords; and if so, converting the text portion into the updated text portion; after determining whether to update the natural language text string, use a parser to convert the natural language text string into a formatted text string; and send the formatted text string to the client device for display thereon.

According to a further aspect of the disclosure, there is provided a computer-readable medium having stored thereon computer program code configured when executed by one or more processors to cause the one or more processors to perform a method comprising: receiving a natural language text string; accessing a keyword database comprising keywords; determining whether to update the natural language text string by, for each of one or more text portions of the natural language text string: determining, using the keyword database, whether to convert the text portion into an updated text portion corresponding to one or more of the keywords; and if so, converting the text portion into the updated text portion; and after determining whether to update the natural language text string, using a parser to convert the natural language text string into a formatted text string.

The method may comprise any of the features and/or operations described above in connection with the conversion of natural language text into formatted text.

According to a further aspect of the disclosure, there is provided a method comprising: obtaining multiple formatted training text strings; for each formatted training text string, generating a natural language training text string; inputting the natural language training text strings to a machine learning model; for each natural language training text string, generating, using the machine learning model, a formatted text string, wherein the formatted text string is associated with one of the formatted training text strings; and adjusting one or more parameters of the machine learning model based on one or more differences between at least one of the formatted text strings and its associated formatted training text string.

Obtaining the formatted training text strings may comprise: selecting text portions from a database of text portions; applying one or more rules to the selected text portions; and converting one or more of the selected text portions into formatted text, based on the application of the one or more rules.

Selecting the text portions may comprise randomly selecting the text portions.

The method may further comprise, prior to applying the one or more rules, randomly selecting the one or more rules from a preset collection of rules.

Generating the natural language training text strings may comprise inputting each formatted training text string to an inverse parser.

The method may further comprise: after adjusting the one or more parameters of the machine learning model, inputting a natural language text string to the machine learning model; and generating, using the machine learning model, a formatted text string.

The method may further comprise: receiving an input indicating one or more adjustments to be made to the generated formatted text string; and updating the generated formatted text string based on the input.

The method may further comprise: converting the updated formatted text string to a further natural language text string; and displaying using the further natural language text string.

Each formatted text string may be formatted for querying a database.

The database may comprise one or more of: images; audio recordings; and video.

Each formatted text string may comprise one or more keywords from a keyword database, and one or more of: each image; and each video may be associated with corresponding metadata comprising one or more keywords from the keyword database.

According to a further aspect of the disclosure, there is provided a system comprising one or more processors communicative with computer-readable memory, wherein the one or more processors are configured to: receive multiple formatted training text strings; for each formatted training text string, generate a natural language training text string; input the natural language training text strings to a machine learning model; for each natural language training text string, generate, using the machine learning model, a formatted text string, wherein the formatted text string is associated with one of the formatted training text strings; and adjust one or more parameters of the machine learning model based on one or more differences between at least one of the formatted text strings and its associated formatted training text string.

The system may comprise any of the features described above in connection with the conversion of natural language text into formatted text. The one or more processors may be configured to perform any of the operations described above in connection with the conversion of natural language text into formatted text.

According to a further aspect of the disclosure, there is provided a computer-readable medium having stored thereon computer program code configured when executed by one or more processors to cause the one or more processors to perform a method comprising: receiving a natural language text string; accessing a keyword database comprising keywords; determining whether to update the natural language text string by, for each of one or more text portions of the natural language text string: determining, using the keyword database, whether to convert the text portion into an updated text portion corresponding to one or more of the keywords; and if so, converting the text portion into the updated text portion; and after determining whether to update the natural language text string, using a parser to convert the natural language text string into a formatted text string.

The method may comprise any of the features and/or operations described above in connection with the conversion of natural language text into formatted text.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Reference will now be made, by way of example, to the accompanying drawings:

FIGS. 3A-3E depict a user interface page or portions thereof in various states when a natural language facet search is being performed.

FIG. 9 depicts a method of training an inverse parser for converting formatted text to natural language text, according to an example embodiment.

FIG. 10 depicts a method of converting formatted text to natural language text, according to an example embodiment.

Similar or the same reference numerals may have been used in different figures to denote similar example features illustrated in the drawings.

DETAILED DESCRIPTION OF EXAMPLE EMBODIMENTS

Figure 1:
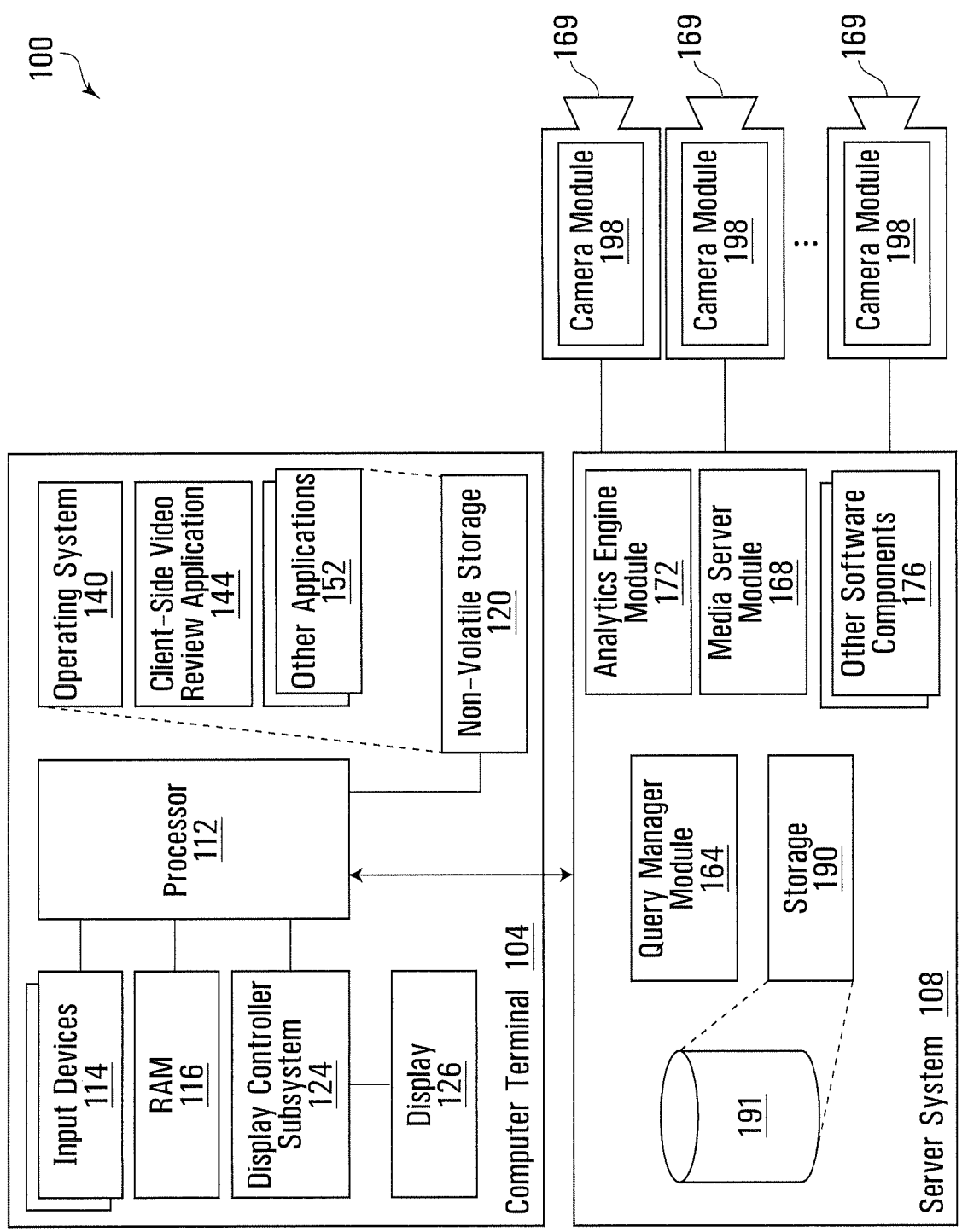
FIG. 1 shows a block diagram of an example video surveillance system within which methods in accordance with example embodiments can be carried out.

It will be understood that, when an element is herein referred to as being "connected", "in communication with", or "coupled" to another element, it can be directly connected, directly in communication with or directly coupled to the other element or intervening elements may be present. In contrast, when an element is herein referred to as being "directly connected", "directly in communication with", or "directly coupled" to another element, there are no intervening elements present. Other words used to describe the relationship between elements should be interpreted in a like fashion (i.e., "between" versus "directly between", "adjacent" versus "directly adjacent", etc.).

As will be appreciated by one skilled in the art, the various example embodiments described herein may be embodied as a method, system, or computer program product. Accordingly, the various example embodiments may take the form of, for example, an entirely software embodiment (including firmware, resident software, micro-code, etc.) or, as another example, an embodiment combining software and hardware aspects that may all generally be referred to herein as a "module" or "system". Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The actual programming language selected is a matter of design choice and, as will be appreciated by those skilled in the art, any suitable programming language can be utilized.

Various example embodiments are described below with reference to flowchart illustration(s) and/or block diagrams of methods, apparatus (systems) and computer program products according to various embodiments. Those skilled in the art will understand that various blocks of the flowchart illustration(s) and/or block diagrams, and combinations of blocks in the flowchart illustration(s) and/or block diagrams, can be implemented by computer program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

This disclosure describes various example embodiments. It is contemplated that any part of any example embodiment described herein may be implemented or combined with any part of any other example embodiment described herein.

Reference is now made to FIG. 1 which shows a block diagram of an example surveillance system 100 within which methods in accordance with example embodiments can be carried out. Included within the illustrated surveillance system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems (not shown). The display controller subsystem 124 interacts with display 126 and it renders graphics and/or text upon the display 126.

Still with reference to the computer terminal 104 of the surveillance system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into a volatile store such as the RAM 116. The processor 112, in addition to its operating system functions, can enable execution of the various software applications on the computer terminal 104.

Figure 2:
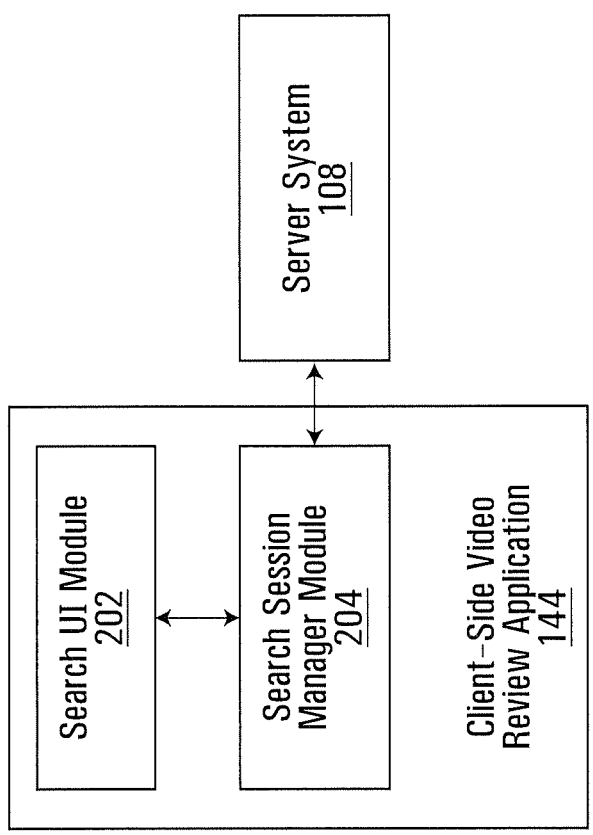
FIG. 2 shows a block diagram of a client-side video review application that, in accordance with certain example embodiments, can be provided within the example surveillance system of FIG.

More details of the video review application 144 are shown in the block diagram of FIG. 2. The video review application 144 can be run on the computer terminal 104 and includes a search User Interface (UI) module 202 for cooperation with a search session manager module 204 in order to enable a computer terminal user to carry out actions related to providing input and, more specifically, input to facilitate identifying same individuals or objects appearing in a plurality of different video recordings. In such circumstances, the user of the computer terminal 104 is provided with a user interface generated on the display 126 through which the user inputs and receives information in relation to the video recordings.

In accordance with some examples, the client-side video review application 144 may be packaged software installed on the computer terminal 104; however in some alternative examples implementation of the UI can be achieved with less installed software through the use of a web browser application (e.g. one of the other applications 152 shown in FIG. 1). A web browser application is a program used to view, download, upload, surf, and/or otherwise access documents (for example, web pages). In some instances, the browser application may be the well-known Microsoft® Edge™. Of course other types of browser applications are also equally possible including, for example, Google® Chrome™. The browser application reads pages that are marked up (for example, in HTML). Also, the browser application interprets the marked up pages into what the user sees rendered as a webpage. The browser application could be run on the computer terminal 104 to cooperate with software components on the server system 108 in order to enable a computer terminal user to carry out actions related to providing input in order to facilitate identifying same individuals or objects appearing in a plurality of different video recordings. In such circumstances, the user of the computer terminal 104 is provided with an alternative example user interface through which the user inputs and receives information in relation to the video recordings.

The video review application 144 also includes the search session manager module 204 mentioned above. The search session manager module 204 provides a communications interface between the search UI module 202 and a query manager module 164 (FIG. 1) of the server system 108. In at least some examples, the search session manager module 204 communicates with the query manager module 164 through the use of Remote Procedure Calls (RPCs).

Besides the query manager module 164, the server system 108 includes several software components for carrying out other functions of the server system 108. For example, the server system 108 includes a media server module 168. The media server module 168 handles client requests related to storage and retrieval of video taken by video cameras 169 in the surveillance system 100. The server system 108 also includes an analytics engine module 172. The analytics engine module 172 can, in some examples, be any suitable one of known commercially available software that carry out mathematical calculations (and other operations) to attempt computerized matching of same individuals or objects as between different portions of video recordings (or as between any reference image and video compared to the reference image). For example, the analytics engine module 172 can, in one specific example, be a software component of the Avigilon Control Center™ server software sold by Avigilon Corporation. In some examples the analytics engine module 172 can use the descriptive characteristics of the person's or object's appearance. Examples of these characteristics include the person's or object's shape, size, textures and color.

The server system 108 also includes a number of other software components 176. These other software components will vary depending on the requirements of the server system 108 within the overall system. As just one example, the other software components 176 might include special test and debugging software, or software to facilitate version updating of modules within the server system 108. The server system 108 also includes one or more data stores 190. In some examples, the data store 190 comprises one or more databases 191 which facilitate the organized storing of recorded video.

Regarding the video cameras 169, each of these includes a camera module 198. In some examples, the camera module 198 includes one or more specialized integrated circuit chips to facilitate processing and encoding of video before it is even received by the server system 108. For instance, the specialized integrated circuit chip may be a System-on-Chip (SoC) solution including both an encoder and a Central Processing Unit (CPU) and/or Vision Processing Unit (VPU). These permit the camera module 198 to carry out the processing and encoding functions. Also, in some examples, part of the processing functions of the camera module 198 includes creating metadata for recorded video. For instance, metadata may be generated relating to one or more foreground areas that the camera module 198 has detected, and the metadata may define the location and reference coordinates of the foreground visual object within the image frame. For example, the location metadata may be further used to generate a bounding box, typically rectangular in shape, outlining the detected foreground visual object. The image within the bounding box may be extracted for inclusion in metadata. The extracted image may alternately be smaller then what was in the bounding box or may be larger then what was in the bounding box. The size of the image being extracted can also be close to, but outside of, the actual boundaries of a detected object.

In some examples, the camera module 198 includes a number of submodules for video analytics such as, for instance, an object detection submodule, an instantaneous object classification submodule, a temporal object classification submodule, and an object tracking submodule. Regarding the object detection submodule, such a submodule can be provided for detecting objects appearing in the field of view of the camera 169. The object detection submodule may employ any of various object detection methods understood by those skilled in the art such as, for example, motion detection and/or blob detection.

Regarding the object tracking submodule that may form part of the camera module 198, this may be operatively coupled to both the object detection submodule and the temporal object classification submodule. The object tracking submodule may be included for the purpose of temporally associating instances of an object detected by the object detection submodule. The object tracking submodule may also generate metadata corresponding to visual objects it tracks.

Regarding the instantaneous object classification submodule that may form part of the camera module 198, this may be operatively coupled to the object detection submodule and employed to determine a visual objects type (such as, for example, human, vehicle or animal) based upon a single instance of the object. The input to the instantaneous object classification submodule may optionally be a sub-region of an image in which the visual object-of-interest is located rather than the entire image frame.

Regarding the temporal object classification submodule that may form part of the camera module 198, this may be operatively coupled to the instantaneous object classification submodule and employed to maintain class information of an object over a period of time. The temporal object classification submodule may average the instantaneous class information of an object provided by the instantaneous classification submodule over a period of time during the lifetime of the object. In other words, the temporal object classification submodule may determine a type of an object based on its appearance in multiple frames. For example, gait analysis of the way a person walks can be useful to classify a person, or analysis of the legs of a person can be useful to classify a cyclist. The temporal object classification submodule may combine information regarding the trajectory of an object (e.g. whether the trajectory is smooth or chaotic, whether the object is moving or motionless) and confidence of the classifications made by the instantaneous object classification submodule averaged over multiple frames. For example, determined classification confidence values may be adjusted based on the smoothness of trajectory of the object. The temporal object classification submodule may assign an object to an unknown class until the visual object is classified by the instantaneous object classification submodule subsequent to a sufficient number of times and a predetermined number of statistics having been gathered. In classifying an object, the temporal object classification submodule may also take into account how long the object has been in the field of view. The temporal object classification submodule may make a final determination about the class of an object based on the information described above. The temporal object classification submodule may also use a hysteresis approach for changing the class of an object. More specifically, a threshold may be set for transitioning the classification of an object from unknown to a definite class, and that threshold may be larger than a threshold for the opposite transition (for example, from a human to unknown). The temporal object classification submodule may aggregate the classifications made by the instantaneous object classification submodule.

In accordance with at least some examples, a feature vector is an n-dimensional vector of numerical features (numbers) that represent an image of an object processable by computers. By comparing the feature vector of a first image of one object with the feature vector of a second image, a computer implementable process may determine whether the first image and the second image are images of the same object.

Similarity calculation can be just an extension of the above. Specifically, by calculating the Euclidean distance between two feature vectors of two images captured by one or more of the cameras 169, a computer implementable process can determine a similarity score to indicate how similar the two images may be.

In some examples, the camera module 198 is able to detect humans and extract images of humans with respective bounding boxes outlining the human objects for inclusion in metadata which along with the associated video may transmitted to the server system 108. At the server system 108, the media server module 168 can process extracted images and generate signatures (e.g. feature vectors) to represent objects. In this example implementation, the media server module 168 uses a learning machine to process the bounding boxes to generate the feature vectors or signatures of the images of the objects captured in the video. The learning machine is for example a neural network such as a convolutional neural network (CNN) running on a graphics processing unit (GPU). The CNN may be trained using training datasets containing millions of pairs of similar and dissimilar images. The CNN may be a Siamese network architecture, for example, trained with a contrastive loss function to train the neural networks.

The media server module 168 deploys a trained model in what is known as batch learning where all of the training is done before it is used in the appearance search system. The trained model, in this embodiment, is a CNN learning model with one possible set of parameters. There is, practically speaking, an infinite number of possible sets of parameters for a given learning model. Optimization methods (such as stochastic gradient descent), and numerical gradient computation methods (such as backpropagation) may be used to find the set of parameters that minimize the objective function (also known as a loss function). A contrastive loss function may be used as the objective function. A contrastive loss function is defined such that it takes high values when it the current trained model is less accurate (assigns high distance to similar pairs, or low distance to dissimilar pairs), and low values when the current trained model is more accurate (assigns low distance to similar pairs, and high distance to dissimilar pairs). The training process is thus reduced to a minimization problem. The process of finding the most accurate model is the training process, the resulting model with the set of parameters is the trained model, and the set of parameters is not changed once it is deployed onto the appearance search system.

In at least some alternative example embodiments, the media server module 168 may determine feature vectors by implementing a learning machine using what is known as online machine learning algorithms. The media server module 168 deploys the learning machine with an initial set of parameters; however, the appearance search system keeps updating the parameters of the model based on some source of truth (for example, user feedback in the selection of the images of the objects of interest). Such learning machines also include other types of neural networks as well as convolutional neural networks.

In accordance with at least some examples, storage of feature vectors within the surveillance system 100 is contemplated. For instance, feature vectors may are indexed and stored in the database 191 with respective video. The feature vectors may also be associated with reference coordinates to where extracted images of respective objects are located in respective video. Storing may include storing video with, for example, time stamps, camera identifications, metadata with the feature vectors and reference coordinates, etc.

The methods, systems, and techniques as described herein are adapted as described further below to search for an object-of-interest. An object-of-interest may comprise a person-of-interest; additionally or alternatively, an object-of-interest may comprise a non-person object, such as a vehicle. More particularly, the server system 108 in at least some example embodiments is configured to perform a "natural language facet search", where a "facet" affects a particular visual characteristic of an object-of-interest. For example, when the server system 108 is being used to search for a person-of-interest, "facets" of that person-of-interest may comprise any one or more of that person's gender, that person's age, a type of clothing being worn by that person, a color of that clothing, a pattern displayed on that clothing, that person's hair color, that person's hair length, that person's footwear color, and that person's clothing accessories (such as, for example, a purse or bag). As another example, when the object-of-interest comprises a vehicle, "facets" of that object-of-interest may comprise, for example, any one or more of that vehicle's color, make, and model.

The server system 108 in at least some example embodiments saves the facet in storage 190 as a data structure comprising a "descriptor" and a "tag". The facet descriptor may comprise a text string describing the type of facet, while the facet tag may comprise a value indicating the nature of that facet. For example, when the facet is hair color, the facet descriptor may be "hair color" and the facet tag may be "brown" or another color drawn from a list of colors. Similarly, when the facet is a type of clothing, the facet descriptor may be "clothing type" and the facet tag may be "jacket" or another clothing type drawn from a list of clothing types. In at least some example embodiments, by text string it is meant a sequence of symbols, where the symbols are selected from an alphabet. Example alphabets comprise the collection of capital and lowercase Latin letters, the Latin letters plus numeric digits and punctuation, the ASCII character set, and the Unicode character set. Irrespective of the specific alphabet, the alphabet's symbols, and thus the derived text strings, may be represented as finite sequences of digital bytes.

Figure 3A:
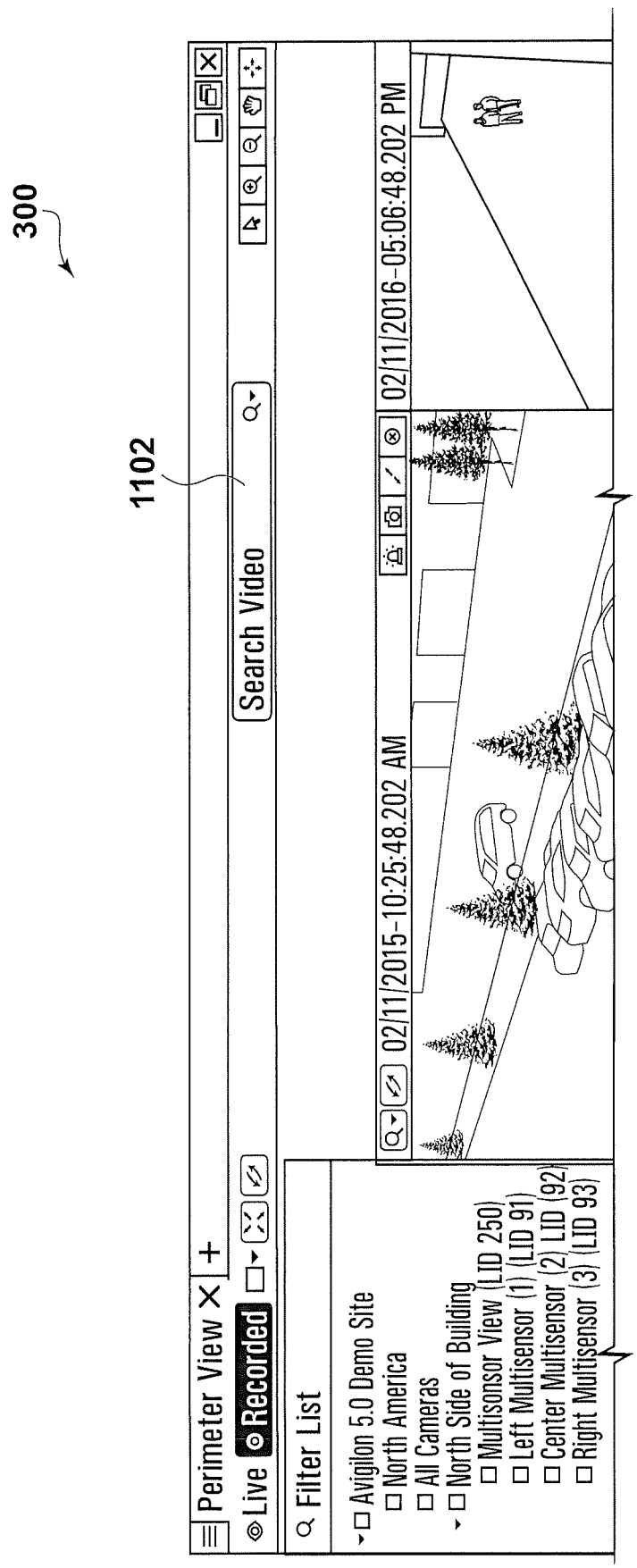

Referring now to FIGS. 3A-3E, there are depicted a user interface page 300 or portions thereof in various states when an example natural language facet search is being performed. FIG. 3A depicts the page 300 comprising a natural language search box 1102 configured to receive a natural language text query from the user. The user may input the query using input devices such as a keyboard and/or a dictation tool.

In at least some example embodiments, the natural language search processing engine may use any one or more of a context-free grammar parse tree, a dependency grammar parser, a probabilistic parser, and word embedding.

FIG. 3B shows a text box 1104 listing example natural language search queries that the server system 108 can process. One example query is "Elderly woman wearing a white sweater between 10-11 am today", in which the object-of-interest is a person, and the facets are her age (elderly), her gender (woman), her type of clothing (a sweater), and her clothing's color (white). Another example query is "Man with brown hair wearing a red shirt around [00:00] today", in which the object-of-interest is again a person, and the facets are his hair color (brown), his type of clothing (a shirt), and his clothing's color (red). The server system 108 further constrains the search with non-facet limitations, which in these two examples comprise time and date of the video recordings to be searched. FIG. 3C similarly depicts an example natural language search query for a, "Man with a mustache wearing a red shirt 8-9 pm tod[ay]". In this example, the object-of-interest is a person, and the facets are his mustache, his type of clothing (shirt), and his color of clothing (red), with additional search constraints of time and date.

FIG. 3D depicts various data collections 1106 (in the form of a selections list) that may be searched in response to a natural language search query. In addition to video, the server system 108 may search any one or more of motion, events, license plates, image thumbnails, text, alarms, and bookmarks. The data collections 1106 may be caused to appear within the client-side video review application 144 in any suitable manner as will be understood by one skilled in the art. For example, in accordance with one example the data collections 1106 may be caused to appear when a cursor clicks on the arrowhead 1107.

Figure 4B:
FIGS. 4A and 4B depict menus allowing a user to select various facets.
Figure 4A:

In at least some examples, the server system 108 performs a facet search immediately after receiving queries of the type depicted in FIGS. 3B-3C. In at least some different examples, the server system 108 first displays the facet search menu 1004 of FIG. 3E to the user in order to confirm the data the server system 108 harvested from the natural language search query. The facet search menu 1004 of FIG. 3E displays a search query 1108 verbatim, and the server system 108 sets the facet selectors 1010, 1016, 1018 according to how it interprets the query. The user may manually adjust the facet selectors 1010, 1016, 1018 as desired. The facet search menu 1004 may also comprise a search button which, once selected, causes the server system 108 to perform the facet search as described above. In at least some different examples such as the one depicted in FIGS. 4A and 4B, various user-selectable images depicting possible facets are presented to the user instead of drop-down menus shown in FIG. 3E.

The facet search as described above may be performed in part by employing an artificial neural network trained as described below. In at least some examples, the artificial neural network comprises a convolutional neural network.

In at least some examples, training images are used to train the convolutional neural network. The user generates a facet image training set that comprises the training images by, for example, selecting images that depict a common type of object-of-interest shown in conjunction with a common type of facet. For example, in at least some example the server system 108 displays a collection of images to the user, and the user selects which of those images depict a type of facet that the user wishes to train the server system 108 to recognize. The server system 108 may, for example, show the user a set of potential training images, of which a subset depict a person (the object) having brown hair (the facet); the user then selects only those images showing a person with brown hair as the training images comprising the training set. Different training images may show different people, although all of the training images show a common type of object in conjunction with a common type of facet. The training images may comprise image chips derived from images captured by one of the cameras 169, where a "chip" is a region corresponding to portion of a frame of a selected video recording, such as that portion within a bounding box.

Once the facet image training set is generated, it is used to train the artificial neural network to classify the type of facet depicted in the training images comprising the set when a sample image comprising that type of facet is input to the network. An example of a "sample image" is an image comprising part of one of the video recordings searched after the network has been trained, such as in the facet search described above. During training, optimization methods (such as stochastic gradient descent), and numerical gradient computation methods (such as backpropagation) are used to find the set of parameters that minimize the objective function (also known as a loss function). A cross entropy function may be used as the objective function. This function is defined such that it takes high values when the current trained model is less accurate (i.e., incorrectly classifies facets), and low values when the current trained model is more accurate (i.e., correctly classifies facets). The training process is thus reduced to a minimization problem. The process of finding the most accurate model is the training process, the resulting model with the set of parameters is the trained model, and the set of parameters is not changed once it is deployed. While in some examples the user generates the training set, in other examples a training set is provided to the artificial neural network for training. For example, a third party may provide a training set, and the user may then provide that training set to the artificial neural network.

During training, the server system 108 records state data corresponding to different states of the convolutional neural network during the training. In at least some examples, the state data is indexed to index data such as at least one of the common type of facet depicted in the training images, identification credentials of a user who is performing the training, the training images, cameras used to capture the training images, timestamps of the training images, and a time when the training commenced. This allows the state of the convolutional neural network to be rolled back in response to a user request. For example, the server system 108 may receive index data corresponding to an earlier state of the network, and reverts to that earlier state by loading the state data indexed to the index data for that earlier state. This allows network training to be undone if the user deems it to have been unsuccessful. For example, if the user determines that a particular type of facet is now irrelevant, the network may be reverted to an earlier state prior to when it had been trained to classify that type of facet, thereby potentially saving computational resources. Similarly, a reversion to an earlier network state may be desirable based on time, in which case the index data may comprise the time prior to when undesirable training started, or on operator credentials in order to effectively eliminate poor training done by another user.

In accordance with example embodiments of the disclosure, there will now be described methods and systems for converting natural language text into formatted text. Converting natural language text into formatted text may enable server system 108 to execute a facet search based on a natural language search query, as described above. There will also be described methods and systems for converting formatted text into natural language text, using a trained machine learning model. The methods and systems hereinafter described may be used by server system 108 for interpreting and otherwise processing natural language search queries inputted by the user, as well as converting database-formatted text, such as image, audio recording, and video metadata, into natural language text, to facilitate interpretation by a human user.

Figure 5:
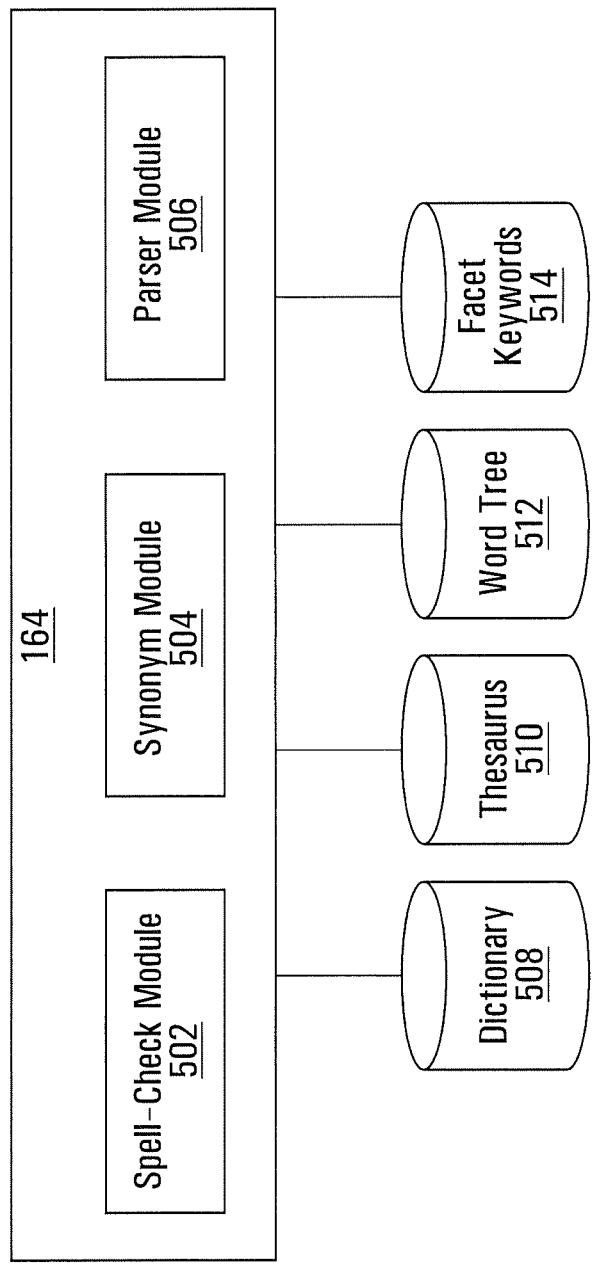
FIG. 5 depicts a query manager module configured to convert natural language text into formatted text, according to an example embodiment.

Turning to FIG. 5, there is shown in more detail the query manager module 164 of server system 108. Query manager module 164 includes an optional spell-check module 502, a synonym module 504, and a parser module 506.

Upon receiving a natural language search query at query manager module 164, spell-check module 502 operates to break down the natural language search query (which hereinafter may be referred to as a natural language text string) into individual words, terms, or other portions. Spell-check module 502 is configured to then perform a spell-check operation on each of the terms identified in the natural language text string. Various spell-checking techniques known in the art may be used by spell-check module 502. For example, spell-check module 502 may compare a spelling of a term identified within the natural language text string to spellings of similar words obtained from a dictionary of stored words. The dictionary may be stored in a dictionary database 508 (in the context of FIG. 1, dictionary database 508 may be comprised in storage 190 of server system 108). For instance, given the natural language text string "Man with a msutace wering a red shirt 8-9 pm tody", spell-check module 1802 may determine that the terms "msutace", "wering", and "tody" are not found within the stored dictionary. Spell-check module 502 may then determine that the most likely words that the user intended to input are "mustache", "wearing", and "today", respectively, and may automatically update the natural language text string accordingly. Alternatively, spell-check module 502 may inform the user that the terms "msutace", "wering", and "tody" are misspelt, and may suggest corrections to the misspelt words. The user may then confirm (or not) that the suggested corrections are to be applied to the natural language text string.

After the natural language text string has been processed by spell-check module 502, the natural language text string (updated to reflect any corrections to misspelt words) is then processed by synonym module 504. The purpose of synonym module 504 is to map each of the terms in the natural language text string to one or more keywords that downstream parser module 506 will recognize. For example, "scarlet" will be mapped to "red", and "kimono" will be mapped to "full_body". In order to determine words, terms, or other portions of the natural language text string that require mapping to keywords recognizable by parser module 506, synonym module 504 may use a language-specific thesaurus and word tree (such as the WordNet word association tree) that may be stored in a thesaurus database 510 and a word tree database 512 (in the context of FIG. 1, thesaurus database 510 and word tree database 512 may be comprised in storage 190 of server system 108). Synonym module 504 may also access a list of facet keywords (e.g. facet descriptors and tags) stored in a keyword database 514, in order to determine those words or terms that are recognizable by parser 506 (in the context of FIG. 1, keyword database 514 may be comprised in storage 190 of server system 108). Thesaurus database 510, word tree database 512, and keyword database 514 may comprise any suitable database such as a relational database or a graph database.

For example, for each term of the natural language text string that is not comprised in keyword database 514, synonym module 504 determines whether the term is equal to or identical to an explicit synonym in the language-specific thesaurus. Equality may be measured using language-specific word vectors. For example, if the term is comprised in the thesaurus, synonym module 504 may output the corresponding thesaurus word assuming that the corresponding thesaurus word is comprised in keyword database 514, before proceeding to the next term in the natural language text string. If the term is not comprised in the thesaurus or if the corresponding thesaurus word is not comprised in keyword database 514, then synonym module 504 may locate the term in the word tree comprised in word tree database 512, and may determine the term's parent word. Parent words are less specific than child words. Synonym module 504 may then determine that the parent word is comprised in the thesaurus, for example. If the parent word is comprised in the thesaurus and is also comprised in keyword database 514, then synonym module 504 may update the natural language text string by converting the term to the parent word. If not, the next-generation parent word of the parent word is checked, until, for example, three parent levels have been explored. Terms in the natural language text string that are not comprised in keyword database 514 and that synonym module 504 is unable to map to a keyword are identified as "unknown". Synonym module 504 may process terms in a variety of different languages, for example by using different word trees that are available in the public domain. Advantageously, by mapping terms in the natural language text string to known keywords, synonym module 504 may enable downstream parser module 506 to act over a relatively smaller dictionary of terms. While in at least some example embodiments the synonym module 504 and the parser module may share the same keyword database 514, in other example embodiments they may use different keyword databases.

After synonym module 504 has processed the natural language text string, the natural language text string, including any terms updated to reflect keywords recognizable by parser module 506 (i.e. that are comprised in keyword database 514), is then processed by parser module 506. At this point, all terms within the natural language text string are either identified as "unknown" or have been converted to terms recognizable by parser module 506. Parser module 506 then uses context-free grammar (CFG) parsing to determine associations between words. For example, "red shirt after 4 pm today" is converted into "red shirt", "a clothing component", and "after 4 pm today", "a date-time component". Each component is then further broken down and converted into a structured format. The individual formatted components combine to form a formatted text string that may be used for querying one or more relational or other databases of stored images, audio recording, and/or video. In other words, the formatted text string is representative of a database entry, and may be compared to other entries in a database in order to locate one or more entries in the database. In particular, each image, audio recording, or video stored in the database may be associated with corresponding metadata indicating one or more facets and other related data that pertains to the image, audio recording, or video in question. For example, a video segment of an adult male wearing a red hat and carrying a briefcase may include the following metadata: {(age: adult), (gender: male), (headwear: hat, red), (accessory: briefcase)}. In the above example of the natural language text string "red shirt after 4 pm today", the formatted text string may take the form of the following (facet, tag) pairs: {(upper_body: red), (start_datetime: 4 pm today)}, where "today" is further mapped to the actual date on which the user issued the natural language query. While the parser module 506 uses on CFG parsing in at least this example embodiment, in at least some different example embodiments the parser module 506 may be statistical, such as a neural parser. Regardless, the parser module 506 uses expected patterns in the language training text string in order to identify associations between text string symbols.

According to some example embodiments, parser module 506 relying on English-language CFG may, in response to receiving as its input "shirt red after 4 pm today", output {(start_datetime: 4 pm today), ("shirt red", unknown)}, because the noun "shirt" and its modifier "red" appear out of order. Any unknown (misunderstood) terms may be displayed on the user interface to inform the user. The user may then modify their query so that their intent is understood by parser module 506. Thus, by requiring that the user input the natural language text in a semi-structured format (i.e. "red shirt" instead of "shirt red"), the building of parser module 506 may be facilitated. As a result, there is generally no need for a large amount of training data required to build parser module 504. When building parser module 506, hundreds of examples of input/output pairs may be used to generate dozens to hundreds of rules; in contrast, building a neural parser may require 10,000 to 1,000,000 input/output pair examples.

With a large number of different facets, it may be too time consuming for a user to manually select specific facets they are looking for. For example, the totality of available facets may not be displayed all at once to the user on the user interface, and the user may have to scroll through the list of facets to identify all of the facets they are interested in. Thus, instead of selecting facets from a list, a user may more easily and more rapidly enter a search query as relative free-form text, using the above-described query manager module 164.

Figure 6:
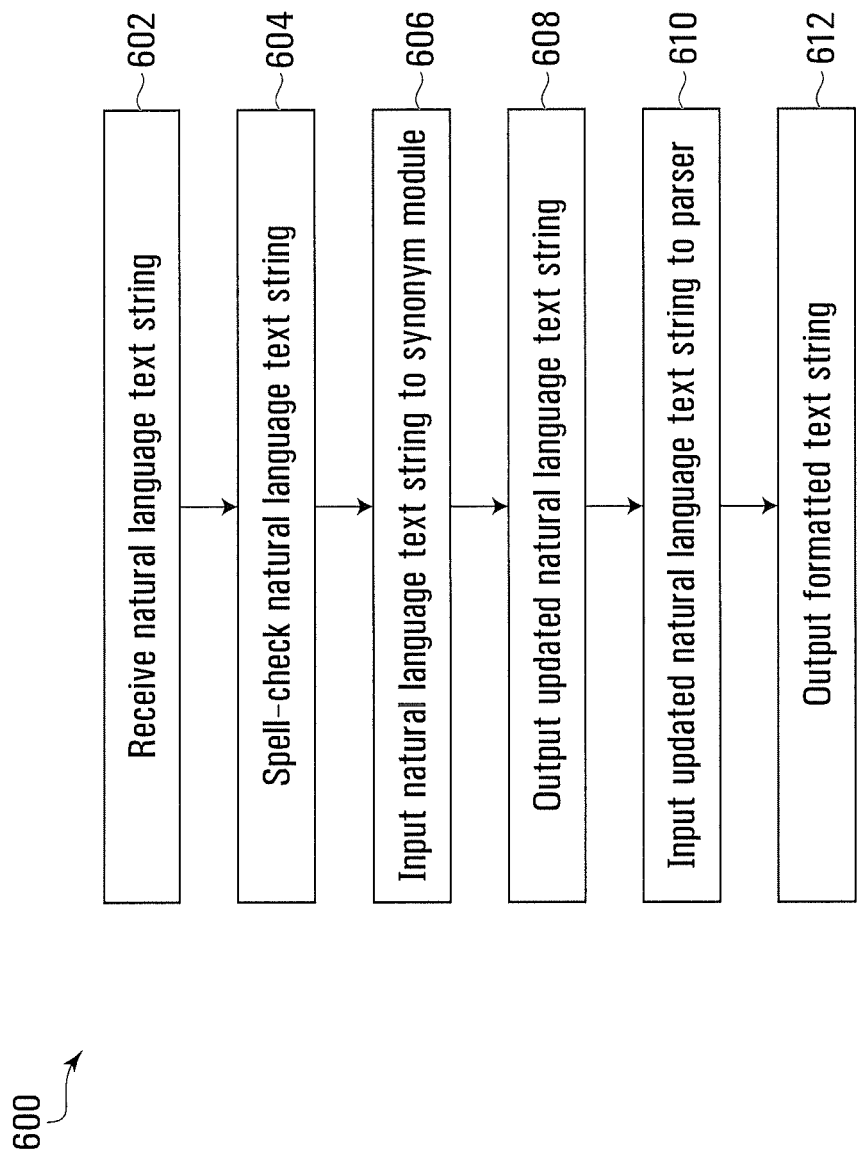
FIG. 6 depicts a method of converting natural language text into formatted text, according to an example embodiment.

Turning to FIG. 6, there is shown a method 600 of converting natural language text to formatted text, according to an example embodiment, and using query manager module 164.

Starting at block 602, query manager module 164 receives, from a user, a natural language text string. For example, a user wishing to search a database of video clips for a person of interest, where the person of interest is known to be a woman wearing a black dress and sunglasses, may enter the natural language text string "woman wearign a long black dress and wearing dark sunglasses, seen after 4 pm yesterday". For example, the user may enter the natural language text string via a user input device such as a keyboard.

At block 604, the natural language text string is spell-checked by spell-check module 502, and spell-check module

502 may automatically correct "wearign" to "wearing". At block 606, the natural language text string "woman wearing a long black dress and wearing dark sunglasses, seen after 4 pm yesterday" is inputted to synonym module 504. At block 608, synonym module 504, using thesaurus, word tree, and keyword databases 510, 512, and 514, converts the natural language text string to "adult female full_body black sunglasses black after 4 pm yesterday".

According to some embodiments, instead of inputting the natural language text string by typing, the user may instead speak the desired words or phrase, and query manager module 164 may detect the spoken words or phrase using one or more microphones or other sound-detecting devices. Using one or more speech processing techniques known in the art, query manager module 164 may then convert the detected speech into the corresponding natural language text string. According to such embodiments, there may be no need for spell-check module 502 to process the natural language text string, since the speech processing techniques may generate accurately spelt natural language text.

At block 610, the updated natural language text string is inputted to parser module 506. At block 612, parser module 506 parses "adult female full_body black sunglasses black after 4 pm yesterday" into a formatted text string suitable for querying a relational database of stored video clips. For example, "adult female full_body black sunglasses black after 4 pm yesterday" is converted into the following formatted form: {(age: adult), (gender: female), (full_body: black), (accessory: sunglasses, black), (start_datetime: 4 pm, yesterday)}. As a final step, a datetime module takes as input the "start_datetime" and/or "end_datetime," if present. If the start or end datetime is an absolute datetime, the datetime module will do nothing to the datetime value. For example, if "start_datetime" is "4 pm, 1 Jun. 2019," the datetime module passes this value on to the search module. If, on the other hand, a datetime is relative, the datetime module resolves the datetime value to an absolute datetime. For example, if "start_datetime" is "4 pm, yesterday," and the date that the user is issuing their query is 2 Jun. 2019, then the datetime module resolves "start_datetime: 4 pm, yesterday" to "start_datetime: 4 pm, 1 Jun. 2019." If the date is not provided in a datetime but the time is provided, the datetime module assumes that the date is the date that the user is issuing the query. For example, if "start_datetime" is "4 pm," and the date that the user is issuing their query is 2 Jun. 2019, then the datetime module resolves "start_datetime: 4 pm" to "start_datetime: 4 pm, 2 Jun. 2019." Any video clips with metadata that corresponds to this formatted text query will be returned to the user (by being displayed on a user interface, for example), as described above.

Figure 7:
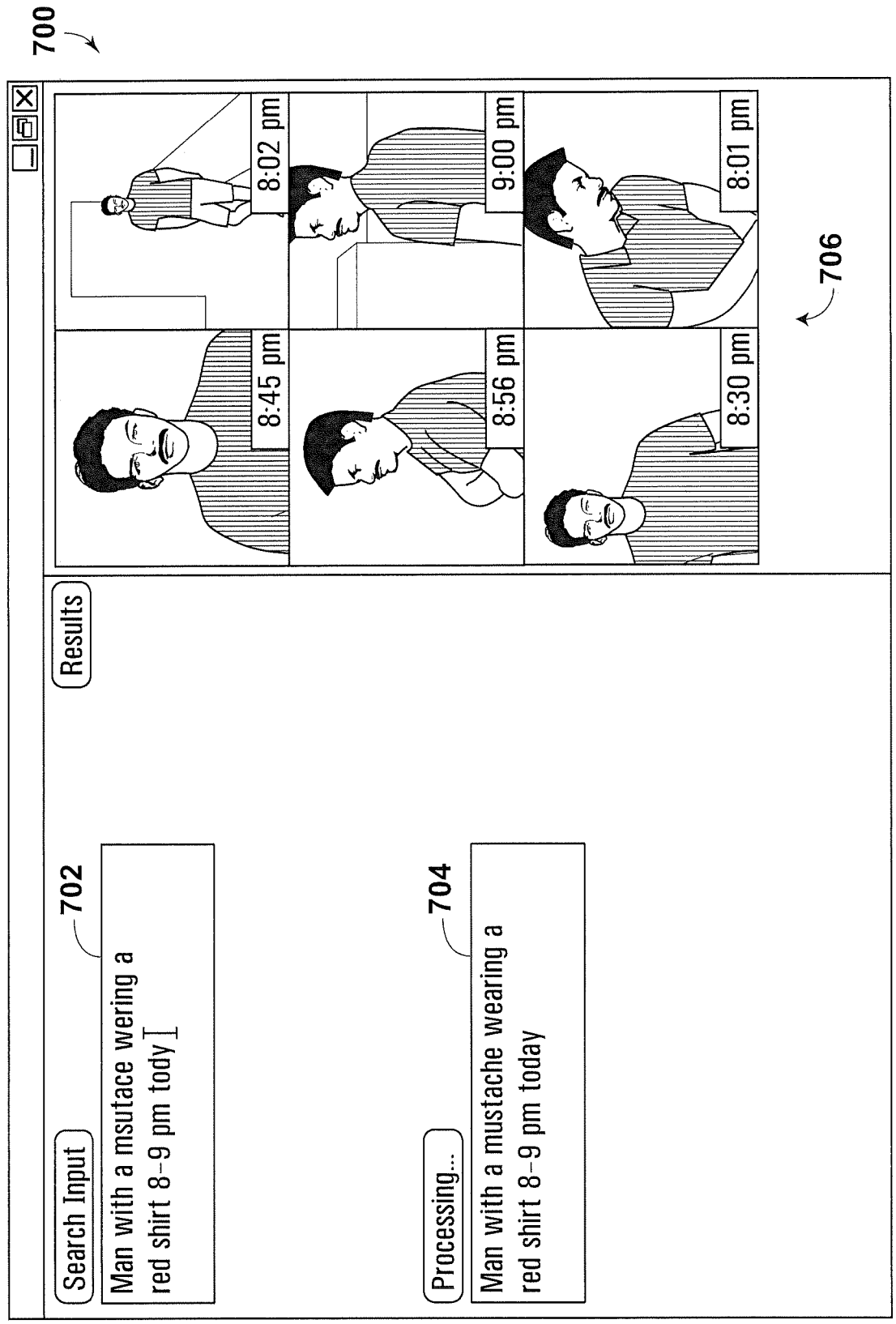
FIG. 7 depicts a user interface page showing the results of a natural language facet search, according to an example embodiment.

FIG. 7 shows an example of a user interface page 700 displaying the results of a natural language facet search. User interface page 700 includes a natural language text string 702 that has been input by a user. Natural language text string 702 includes a number of spelling mistakes that are corrected by spell-check module 502. The corrected natural language text string 704 is then converted into a formatted text string (not shown) and used to query a database of images. Images 706 of potential objects-of-interest that are returned by query manager module 164 and are shown on the right-hand side of user interface page 700.

In addition to converting natural language text input into formatted text input, methods and systems of the disclosure may additionally enable the reverse, i.e. the conversion of formatted text into natural language text. Such methods and systems have particular application in enabling a human user to rapidly understand database output.

As one particular example, one may consider the case of a video surveillance system that uses the metadata associated with a video clip to determine the clip's importance. As described above, the metadata generally comprises a list of field-token values describing, for example, the appearance of a subject in the video (i.e. clothing, vehicle type), the relationship between subjects in the video (i.e. fighting, exiting), and the locations of the subject or subjects in the video. These metadata fields are represented using database entries associated with the video clip. The fields may have been filtered by a machine learning process to include only the metadata that contributes to the computer system's determination of the video clip's importance. By converting the metadata from a structured, formatted form to a natural language form, a user may more rapidly interpret the natural language text (as opposed to if they were presented directly with the metadata) and thereby determine why the computer system has considered the video clip to be of importance. In contrast, a video system that can automatically determine a video clip to be important, but cannot portray to the user the reason for its importance, might be deemed unreliable by the human user. Likewise, a video system that displays the raw metadata, though not in a natural language or free text form, is still interpretable, but may require substantial effort on the part of the human user for its understanding, particularly when the metadata schema is complex.

For example, a video clip of a person captured running across an office space may be associated with the following metadata: {(age: adult), (gender: male), (upper_body: green, short sleeves), (lower_body: brown, short length) (accessory: cap, blue), (start_datetime: 3 pm, today), (end_datetime: 3 pm, today), (location: $3^{rd}$ floor), (activity: running)}. A user presented with this information may struggle to rapidly identify why the video clip may be of importance. By using the methods and systems described below, this formatted metadata may be converted into the following natural language text, prior to being displayed to the user: "man wearing green t-shirt brown shorts blue cap running on $3^{rd}$ floor at 3 pm today". This free-form text may be assimilated more rapidly by the user.

A human user may also edit this natural language text output and re-submit it to the database as a formatted text query, using the above-described parser. This may provide useful feedback to server system 108. For example, if an outputted video clip is determined to be important, then the user may edit the associated natural language text to indicate the true reason for the video clip's importance. This updated text may then be converted into formatted text using the above-described query manager module 164, the formatted text being configured for querying the database of video. Conversely, the text of unimportant video clips can be edited by the user to generate database queries for rules that exclude matching video clips from consideration. Such specific feedback may be used to generate queries or rules that can be applied immediately, without the need for many examples: single examples of important or unimportant events result in effective training events.

Returning to the above example, a user may determine from the natural language text string "man wearing green t-shirt brown shorts blue cap running on $3^{rd}$ floor at 3 pm today" that this particular individual is of interest, and may modify the natural language text output by deleting the portion "running on $3^{rd}$ floor at 3 pm today". This generates a new natural language text string as follows: "man wearing green t-shirt brown shorts blue cap". This new natural language text string may then be converted to a formatted text string as described above. Thus, query manager module 164 may then query the database of video clips to return any appropriate video clips of the above individual (irrespective of date, time, the subject's location, and whether or not they are running).

Figure 8:
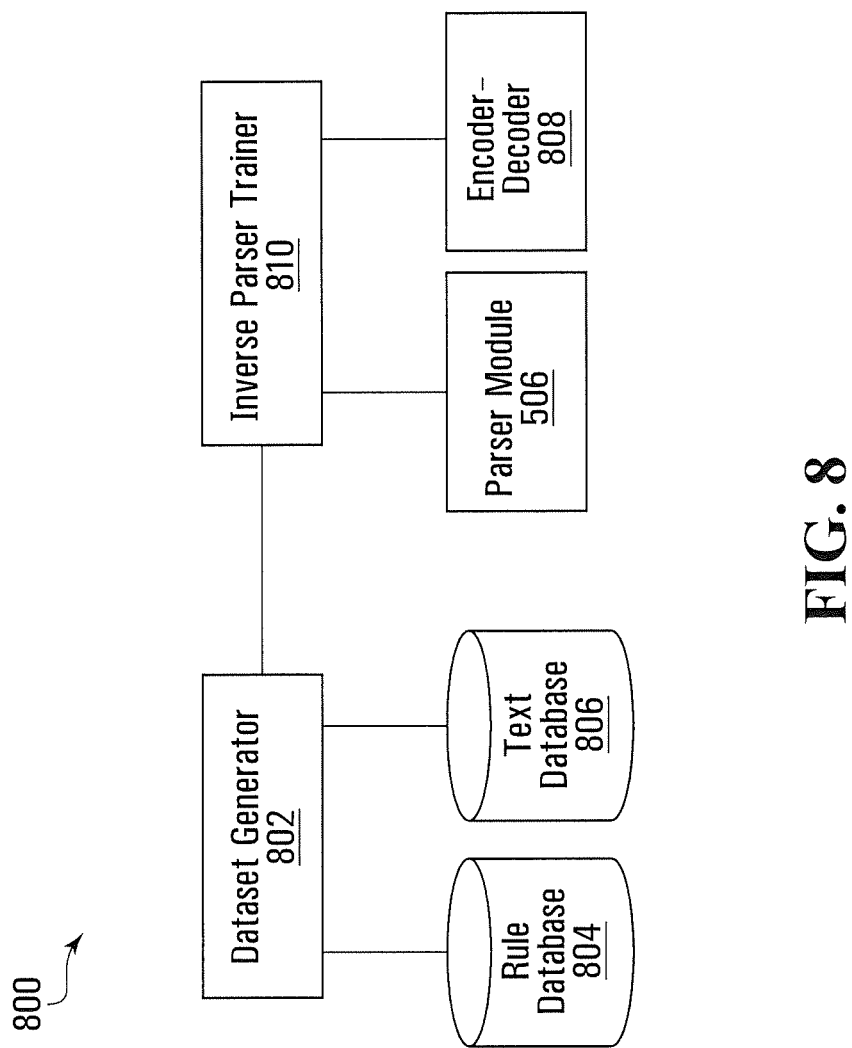
FIG. 8 depicts a system for training an inverse parser, according to an example embodiment.

The formatted text is converted into natural language text using an inverse parser, as now described in further detail with reference to FIGS. 8 and 9. FIG. 8 shows a system 800 for converting formatted text into natural language text in accordance with an example embodiment. The system includes a dataset generator 802 operable to access a rule database 804 and a text database 806. Dataset generator 802 is furthermore communicative with an inverse parser trainer 810 operable to access parser module 506 (i.e. parser module 506 of FIG. 5) and an encoder-decoder machine learning model 808.

According to some embodiments, the natural language text that has been generated from formatted text may be further converted into audio (e.g. computer-generated speech) to assist a user that may not always be interfacing with the user interface (e.g. a police officer on duty). For example, metadata associated with the above video clip of the person captured running across the office space may be converted into natural language text which may then be subsequently converted into computer-generated speech. According to some embodiments, both the natural language text may be displayed and the corresponding audio may be played.

Turning to FIG. 9, there is now described a method 900 of training an inverse parser for converting formatted text into natural language text in accordance with an example embodiment, and using the system shown in FIG. 8. At block 902, dataset generator 802 samples portions of text from text database 806. The sampling of text from text database 806 may be based on one or more rules from rule database 804. For example, the one or more rules may dictate that 40% of the phrases sampled from text database 806 refer to a female person, 40% refer to a male person, and 20% do not specify the person's gender. At block 904, dataset generator 802 converts the sampled text phrases into natural language text strings (which may be referred to as natural language training text strings), by application of one or more rules selected from rule database 804. In particular, dataset generator 802 randomly selects one or more rules from rule database 804 for generating correct natural language text. For example, one of the rules may specify that, "male" and "child" are to be combined into "boy". At block 906, inverse parser trainer 810 inputs the generated natural language training text strings to parser module 506. At block 908, parser module 506 outputs formatted training text strings, as described above in connection with FIGS. 5 and 6. At block 910, the formatted training text strings are inputted to encoder-decoder machine learning model 808. The encoder-decoder machine learning model 808 may be a pair of recurrent neural networks; however, alternatively other machine learning models may also be used. At block 912, encoder-decoder machine learning model 808 outputs natural language text strings as a function of the inputted formatted training text strings.

Generally, the encoder is configured to accept an input sequence of symbols and produces a vector representation for each symbol in the sequence. The decoder takes the sequence of vector representations and produces an output sequence of symbols. When arranged in a recurrent neural network, the encoder acting on a symbol produces a vector representation that is based in part on the input symbol and in part on the vector representation output from the previous symbol. Although the vector representation cannot be interpreted directly, the encoder is able to represent information from the present symbol and from its context in the sequence. Moreover, as the vector representation is the only mechanism for flowing information from the input sequence to the output sequence, it forms a bottleneck that constrains the training of the encoder-decoder pair such that a machine learning algorithm such as stochastic gradient descent can converge and generalize to produce correct outputs for input sequences not seen in training.

In the present case, the input sequence comprises a sequence of ASCII characters that comprise the formatted training text strings, while the output sequence comprises a sequence of Unicode characters that form the natural language text strings. Persons skilled in the art will be aware of variations and improvements to the encoder-decoder architecture, in particular the attention mechanism which variously weights input symbols according to their context in the input sequence, prior to their introduction to the encoder.

Returning to FIG. 9, each natural language text string that is outputted by encoder-decoder machine learning model 808 is associated with a corresponding natural language training text string (i.e. the natural language training text string that resulted in the generation of the formatted training text string that in turn resulted in the generation of the natural language text string). At block 914, each natural language text string is compared to its corresponding natural language training text string. Based on any differences between the natural language text string and its associated natural language training text string, at block 916 the parameters of encoder-decoder machine learning model 808 are adjusted such that the correct natural language training text string is outputted (i.e. such that the outputted natural language training text string approaches a like-for-like correspondence with its associated natural language training text string). Any machine learning model suited to symbol-based translation may serve in place of the specific encoder-decoder model described herein. For example, encoder-decoder models that include an attention mechanism, or those that are entirely attention-based are suitable alternatives to the pure encoder-decoder model used as an example here.

Once encoder-decoder machine learning model 808 is trained, it may then be used to generate natural language text output based on formatted text input. In particular, referring to FIG. 10 which shows a method of converting formatted text to natural language text, at block 1002 a formatted text string is generated by server system 108. For example, server system 108 may be configured to output for display any video clips and their associated metadata that correspond to a search query issued by a user. In this case, the outputted metadata may correspond to the formatted text string. At block 1004, the formatted text string is inputted to machine learning model 808. At block 1006, trained machine learning model 808 outputs a natural language text string. Thus, instead of, or in addition to outputting metadata in the form of a formatted text string, server system 108 may output a natural language text string that corresponds to the formatted text string. As described above, a user may indicate one or more corrections that should be made to the natural language text string. Such corrections may result in updates to the natural language text string, and the updated natural language text string may then be used as a new search query (for example, as described above in the context of the search query issued for the woman wearing a black dress).

Figure 11:
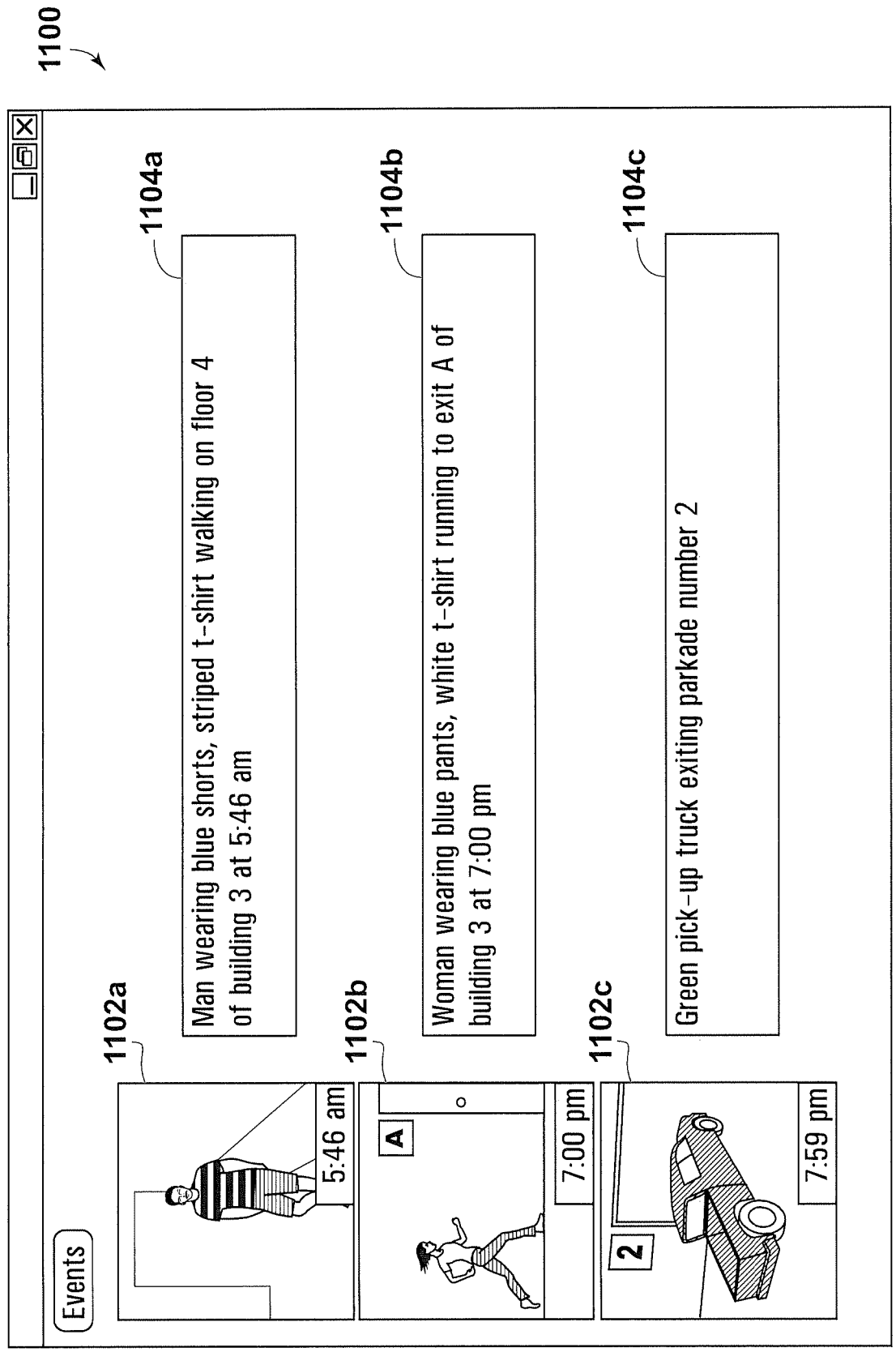
FIG. 11 depicts a user interface page showing video clips and associated natural language text, according to an example embodiment.

FIG. 11 shows a user interface page 1100 displaying video clips 1102a-c with corresponding natural language text strings 1104*a-c* in accordance with an example embodiment. Natural language text strings 1104*a-c* are generated based on the metadata associated with each video clip 1102*a-c*. In particular, as described above, the metadata may be stored in the form of formatted text, and server system 108 may convert the formatted text into natural language text using the method of FIG. 9.

Figure 12:
FIG. 12 depicts a method of training a parser for converting natural language text to formatted text, according to an example embodiment.

In addition to training an inverse parser for converting formatted text to natural language text, it is also possible train a parser for converting natural language text to formatted text, using a machine learning model. Such an approach is likely require significantly more data than building parser module 506 shown in FIG. 5, but given sufficient data may result in a more accurate parser. FIG. 12 shows a method 1200 of training a parser for converting natural language text to formatted text in accordance with an example embodiment. The system that would be required to train the parser would be similar to the system shown in FIG. 8, except that parser module 506 would be replaced with an inverse parser, such as the inverse parser trained using the method in FIG. 9.

In particular, at block 1202, dataset generator 802 samples portions of text from text database 806. The sampling of text from text database 806 may be based on one or more rules from rule database 804. For example, the one or more rides may dictate that 40% of the phrases sampled from text database 806 refer to a female person, 40% refer to a male person, and 20% do not specify the person's gender. At block 1204, dataset generator 802 converts the sampled text phrases into formatted text strings (which may be referred to as formatted training text strings), by application of one or more rules selected from rule database 804. In particular, dataset generator 802 randomly selects one or more rules from rule database 804 for generating correct formatted text. For example, one of the rules may specify that, "boy" is to be converted into "{(gender: male), (age: child)}". At block 1206, parser trainer 810 inputs the generated formatted training text strings to inverse parser module 506. At block 1208, inverse parser module 506 outputs natural language training text strings, as described above in connection with FIGS. 6 and 7. At block 1210, the natural language training text strings are inputted to machine learning model 808. The machine learning model may be, for example, a neural dependency parser such as that described in Danqi Chen and Christopher Manning. "A Fast and Accurate Dependency Parser Using Neural Networks." in Proceedings of EMNLP 2014, although other models, including the encoder-decoder architecture described earlier, may be likewise used. At block 1212, machine learning model 808 outputs formatted text strings as a function of the inputted natural language training text strings. Each formatted text string that is outputted by machine learning model 808 is associated with a corresponding formatted training text string (i.e. the formatted training text string that resulted in the generation of the natural language training text string that in turn resulted in the generation of the formatted text string). At block 1214, each formatted text string is compared to its corresponding formatted training text string. Based on any differences between the formatted text string and its associated formatted training text string, at block 1216 the parameters of machine learning model 808 are adjusted such that the correct formatted training text string is outputted (i.e. such that the outputted formatted training text string approaches a like-for-like correspondence with its associated formatted training text string).

It is contemplated that any part of any aspect or embodiment discussed in this specification can be implemented or combined with any part of any other aspect or embodiment discussed in this specification.

Therefore, the above discussed embodiments are considered to be illustrative and not restrictive, and the invention should be construed as limited only by the appended claims.

The invention claimed is:

1. A method comprising:
   obtaining a plurality of natural language training text strings;
   for each of the natural language training text strings, generating a respective formatted training text string, wherein each of the formatted training text strings is structured, is for querying a relational database, and is representative of metadata of a database entry of the relational database;
   inputting the formatted training text strings to a machine learning model;
   for each of the formatted training text strings, generating, using the machine learning model, a respective natural language text string, wherein each of the natural language text strings is associated with a respective one of the natural language training text strings;
   adjusting one or more parameters of the machine learning model based on one or more differences between at least one of the generated natural language text strings and the respective natural language training text string;
   after adjusting the one or more parameters of the machine learning model, inputting a further formatted text string to the machine learning model; and
   generating, using the machine learning model, a further natural language text string.

2. The method of claim 1, wherein obtaining the natural language training text strings comprises:
   selecting text portions from a database of text portions;
   applying one or more rules to the selected text portions; and
   converting one or more of the selected text portions into natural language text, based on the application of the one or more rules.

3. The method of claim 2, wherein selecting the text portions comprises randomly selecting the text portions.

4. The method of claim 2, further comprising, prior to applying the one or more rules, randomly selecting the one or more rules from a preset collection of rules.

5. The method of claim 1, wherein generating the formatted training text strings comprises inputting each natural language training text string to a context-free grammar parser or a neural parser.

6. The method of claim 1, further comprising:
   receiving an input indicating one or more adjustments to be made to the generated further natural language text string; and
   updating the generated further natural language text string based on the input.

7. The method of claim 6, further comprising:
   converting the updated natural language text string to an other formatted text string; and
   querying a database using the other formatted text string.

8. The method of claim 1, wherein the relational database comprises one or more of: images; audio recordings; and videos.

9. The method of claim 8, wherein each of the formatted text strings comprises one or more keywords from a keyword database, and wherein one or more of: each of the images; each of the audio recordings; and each of the videos is associated with corresponding metadata comprising one or more keywords from the keyword database.

10. A method comprising:
obtaining a formatted text string, wherein the formatted text string is structured, the formatted text string is for querying a relational database, and the formatted text string is representative of metadata of a database entry of the relational database;
inputting the formatted text string to an inverse parser comprising a machine learning model trained to convert formatted text into natural language text; and
generating, using the inverse parser, a natural language text string,
wherein the relational database comprises one or more of: images; audio recordings; videos; and text sources, and
wherein the formatted text string comprises one or more keywords from a keyword database, and wherein one or more of: each of the images; each of the audio recordings; each of the videos; and each of the text sources is associated with corresponding metadata comprising one or more keywords from the keyword database.

11. The method of claim 10, further comprising:
receiving an input indicating one or more adjustments to be made to the generated natural language text string; and
updating the natural language text string based on the input.

12. The method of claim 11, further comprising:
converting the updated natural language text string to a further formatted text string; and using the further formatted text string to query the relational database.

13. The method of claim 10, wherein obtaining the formatted text string comprises generating the formatted text string in accordance with contents of one or more of: an image; an audio recording; and a video.

14. A method comprising:
receiving a natural language text string;
accessing a keyword database comprising keywords;
determining whether to update the natural language text string by, for each of one or more text portions of the natural language text string:
  determining, using the keyword database, whether to convert the text portion into an updated text portion corresponding to one or more of the keywords; and
  if so, converting the text portion into the updated text portion; and
after determining whether to update the natural language text string, using a parser to convert the natural language text string into a formatted text string, wherein the formatted text string is structured, the formatted text string is for querying a relational database, and the formatted text string is representative of metadata of a database entry of the relational database,
wherein the relational database comprises one or more of: images; audio recordings; videos; and text sources, and
wherein the formatted text string comprises one or more keywords from the keyword database, and wherein one or more of: each of the images; each of the audio recordings; each of the videos; and each of the text sources is associated with corresponding metadata comprising one or more keywords from the keyword database.

15. The method of claim 14, wherein the parser comprises a context-free grammar parser or a neural parser.

16. The method of claim 14, further comprising, prior to determining whether to update the natural language text string:
accessing a dictionary database;
determining, using the dictionary database, whether to correct a spelling of one or more text portions of the natural language text string; and
if so, correcting the spelling of the one or more text portions.

17. The method of claim 14, further comprising querying the relational database using the formatted text string.

18. The method of claim 14, wherein determining whether to convert the text portion into an updated text portion is further based on one or more of a thesaurus and a word tree.

19. A method comprising:
obtaining a plurality of formatted training text strings, wherein each of the formatted training text strings is structured, is for querying a relational database, and is representative of metadata of a database entry of the relational database;
for each of the formatted training text strings, generating a respective natural language training text string;
inputting the natural language training text strings to a machine learning model;
for each of the natural language training text strings, generating, using the machine learning model, a respective formatted text string, wherein the formatted text string is associated with a respective one of the formatted training text strings;
adjusting one or more parameters of the machine learning model based on one or more differences between at least one of the formatted text strings and the respective formatted training text string; and
after adjusting the one or more parameters of the machine learning model, inputting a further formatted text string to the machine learning model; and
generating, using the machine learning model, a further natural language text string.

* * * * *